US010473463B2

(12) United States Patent
Agata

(10) Patent No.: US 10,473,463 B2
(45) Date of Patent: Nov. 12, 2019

(54) WATER LEVEL MEASUREMENT SYSTEM AND WATER LEVEL MEASUREMENT METHOD

(71) Applicant: HITACHI KOKUSAI ELECTRIC INC., Tokyo (JP)

(72) Inventor: Yoshiki Agata, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/080,419

(22) PCT Filed: Mar. 4, 2016

(86) PCT No.: PCT/JP2016/056734
§ 371 (c)(1),
(2) Date: Aug. 28, 2018

(87) PCT Pub. No.: WO2017/149744
PCT Pub. Date: Sep. 8, 2017

(65) Prior Publication Data
US 2019/0078882 A1 Mar. 14, 2019

(51) Int. Cl.
H04N 9/47 (2006.01)
H04N 7/18 (2006.01)
(Continued)

(52) U.S. Cl.
CPC .......... *G01C 13/00* (2013.01); *G01F 23/292* (2013.01); *G06T 7/12* (2017.01); *G06T 7/162* (2017.01);
(Continued)

(58) Field of Classification Search
None
See application file for complete search history.

(56) References Cited

U.S. PATENT DOCUMENTS 6,098,029 A * 8/2000 Takagi ............... G06T 7/60
382/100
2009/0107234 A1* 4/2009 Kim ............... G01C 13/008
73/293
(Continued)

FOREIGN PATENT DOCUMENTS

JP H11-122602 A 4/1999
JP 2007-256254 10/2007

OTHER PUBLICATIONS

International Search Report dated May 31, 2016.
(Continued)

*Primary Examiner* — Talha M Nawaz
(74) *Attorney, Agent, or Firm* — Bacon & Thomas, PLLC

(57) ABSTRACT

In a technology for detecting the water level of a river by image processing, after an angle of view setting process, an area setting unit sets an arbitrarily defined certain range from the center of the set angle of view as a processing area. Then, a flow processing unit calculates, from the processing area, motion information and a flow direction, computes a flow density, determines a region having a high density and similar flow directions to be a flow of water currents, and deletes flows in the other directions. Thereafter, a graph-cut processing unit creates an object seed and a background seed for graph-cutting, and detects a water surface by automatic graph-cutting. After an edge extraction processing unit has performed edge extraction, a water level calculation processing unit determines an edge that satisfies a predetermined condition to be a water level line, and outputs a water level measurement result.

5 Claims, 13 Drawing Sheets

(51) Int. Cl.
*G01C 13/00* (2006.01)
*G01F 23/292* (2006.01)
*G06T 7/20* (2017.01)
*G06T 7/60* (2017.01)
*G06T 7/12* (2017.01)
*G06T 7/162* (2017.01)
*G06T 7/215* (2017.01)

(52) U.S. Cl.
CPC ............... *G06T 7/20* (2013.01); *G06T 7/215* (2017.01); *G06T 7/60* (2013.01); *G06T 2207/10016* (2013.01); *G06T 2207/10024* (2013.01); *G06T 2207/30181* (2013.01); *G06T 2207/30241* (2013.01); *Y02A 90/32* (2018.01)

(56) References Cited

U.S. PATENT DOCUMENTS

2010/0158386 A1* 6/2010 Smilansky .............. G01F 22/00
382/194
2010/0220914 A1* 9/2010 Iwase .................. A61B 5/0066
382/131

OTHER PUBLICATIONS

Shun'ichi Tokoyoda et al., "Graph Cuts Segmentation Considering intensity Difference in the Proximal Area", The institute of Image Information and Television Engineers Nenji Taikai Koen Yokoshu (2009), Aug. 26, 2009 (Aug. 26, 2009), pp. 17-1-1, 17-1-2.

* cited by examiner

EXTRACTING WATER SURFACE ONLY

WATER LEVEL MEASUREMENT SYSTEM AND WATER LEVEL MEASUREMENT METHOD

FIELD OF THE INVENTION

The present invention relates to a water level measurement system and a water level measurement method; and, particularly, to a water level measurement system and a water level measurement method using an image processing technique.

BACKGROUND OF THE INVENTION

As for a generally used water level measurement method, there are two methods, i.e., a method using a water gauge and a method using image processing. The method using a water gauge can measure a water level with high accuracy by transmitting a pressure measured by a detector installed in water to a measuring board via a repeater. The method using image processing which is considered as a method replacing the method using a water gauge proposes various techniques (see, e.g., Patent Document 1). FIG. 2 shows an outline of water level measurement using image processing. A monitoring camera 500 set on a river RV side images a predetermined area CA of the river RV which includes a structure OB. In the measurement method using image processing, a water level is measured by detecting a boundary WL with respect to a water surface W from an image B0 of the monitoring camera 500 through image processing.

In a disaster prevention system, when it is determined that a water level of a river which is constantly measured by the above methods reaches a dangerous level, for example, alarm is notified to a monitoring center, and the monitoring center that received the notification gives an evacuation instruction to neighboring residents.

Patent Document 1: Japanese Patent Application Publication No. 2008-057994

However, the above-described two water level measurement methods have drawbacks. First, the method using a water gauge which has been introduced for river monitoring has two major drawbacks. The first drawback is that it is not difficult to observe fine water level variation between an upstream side and a downstream side of a river since a small number of water gauges is installed. When a monitoring camera and a water gauge are distanced from each other, an error occurs in the water level appearing on the camera and a measurement value of the water gauge. Although this drawback can be solved by increasing the number of water gauges, it is expected that a high installation cost and a high maintenance cost are required, which is not realistic. Second, when an observer checks only a measurement value of the water gauge, it is difficult to display a state of a river corresponding to a current measurement value. Accordingly, it is difficult for the observer to make accurate judgment, and an evacuation instruction may be delayed.

The first drawback can be solved by using an existing monitoring camera. This is because monitoring cameras are often installed at a short distance in major rivers managed by the Ministry of Land, Infrastructure and Transport of Japan. If the water level can be measured from this camera image, it is possible to observe fine water level variation of the river and minimize an equipment installation cost. The second drawback can be solved by displaying a current water level on a camera image. By drawing the water level line on the image, it is easier to visually judge dangerous situation, and a prompt evacuation instruction can be made. Due to these advantages, the demand for water level measurement by image processing using an existing monitoring camera is increasing.

However, the water level measurement using image processing is disadvantageous in initial setting and measurement accuracy. First, in regard to the initial setting, it is necessary that an expert sets an angle of view in order to perform image processing with high accuracy. This is disadvantageous in that the number of working processes at the time of introduction is increased and it is difficult to change the angle of view after the introduction. In regard to the measurement accuracy, the accuracy may deteriorate depending on an environment of a measurement target area. The accuracy deteriorates when a water surface cannot be detected accurately and when motion other than water flow inflicts an adverse effect. The water level measurement using image processing is realized by finding a boundary line between the water surface and a pier or the like above the water surface. Therefore, if the water surface cannot be detected accurately, the accuracy deteriorates. FIG. 2 shows an example of an image B1 having reflection R of the structure OB on the water surface W. If the structure OB such as a bridge pier or the like is reflected on the water surface W, the water surface W may be determined as the structure OB. Therefore, a new technique for measuring a water level through image processing is required.

SUMMARY OF THE INVENTION

The present invention has been made in view of such conventional circumstances, and it is an object of the present invention to solve the above drawbacks.

In accordance with an aspect of the present invention, there is provided a water level measuring system including: a flow processing unit configured to acquire an image with a water surface and a structure and calculate motion information (motion vector); a graph-cut processing unit configured to specify a water surface region of the water surface by using a graph cut theory based on the motion information; and a water level calculating unit configured to calculate a water level based on a boundary between the water surface region and another region.

The flow processing unit may extract a water current flow from the motion information, and the graph-cut processing unit may extract the water surface region by performing labeling processing on the extracted water current flow and the other flows based on the graph cut theory.

The water level measuring system may further include an edge extraction processing unit configured to extract an edge near a boundary between the water surface region specified by the graph-cut processing unit and another region and set an edge satisfying a predetermined feature from the extracted edge to a boundary for calculating the water level.

The water level measurement system may further include a setting unit configured to set an angle of view of a camera that images the image with the water surface and the structure by manipulating a cross bar displayed on a screen.

In accordance with another aspect of the present invention, there is provided a water level measurement method for measuring a water level of a river by using an image processing technique, the method including: a flow processing step of acquiring an image with a water surface and a structure and calculating motion information (motion vector); a graph cut processing step of specifying a region of the water surface by using a graph cut theory based on the motion information; and a water level calculating step of calculating a water level based on a boundary between the water surface region and another region.

In the flow processing step, a water current flow may be extracted from the motion information, and in the graph cut processing step, the water surface region may be extracted by performing labeling processing on the extracted water level flow and the other flows based on the graph cut theory.

The water level measurement method may further include an edge extracting step of extracting an edge near the boundary between the water surface region specified in the graph cut processing step and calculating an edge satisfying a specific feature from the extracted edge.

Effect of the Invention

As described above, in accordance with the present invention, it is possible to realize high-accuracy water level measurement by detecting a water surface with high accuracy by an image processing technique using a graph cut theory based on motion information (motion vector).

DETAILED DESCRIPTION OF THE EMBODIMENTS

Next, a mode for implementing the present invention (hereinafter, simply referred to as "embodiment") will be described in detail with reference to the drawings. In an embodiment to be described below, high-accuracy water level measurement is realized by detecting a water surface with high accuracy by an image processing technique referred to as "graph-cut" based on motion information (motion vector), and detecting and deleting the motion information other than water flow. At the time of initial setting, an interface that allows an appropriate angle of view to be obtained simply by setting an angle of view such that a cross bar on a setting screen becomes the center of a bridge pier or the like above the water surface is realized.

Figure 1:
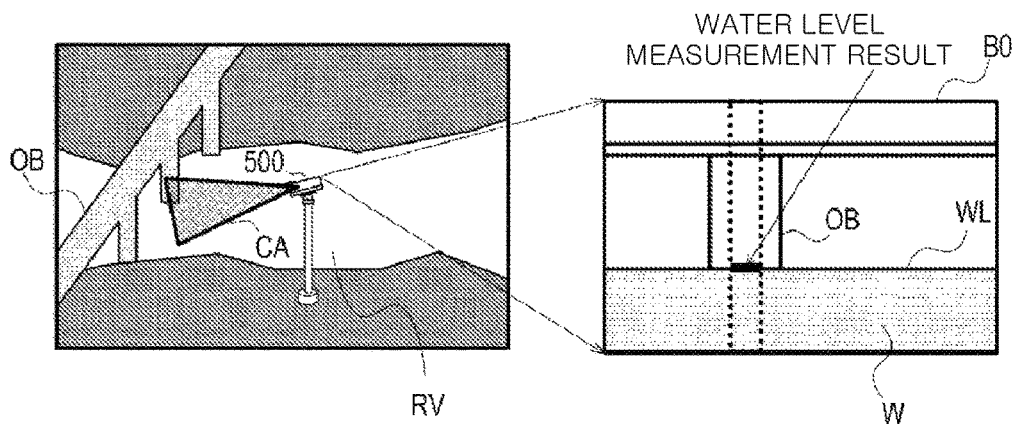
FIG. 1 shows an outline of water level measurement using image processing according to a background art.
Figure 2:
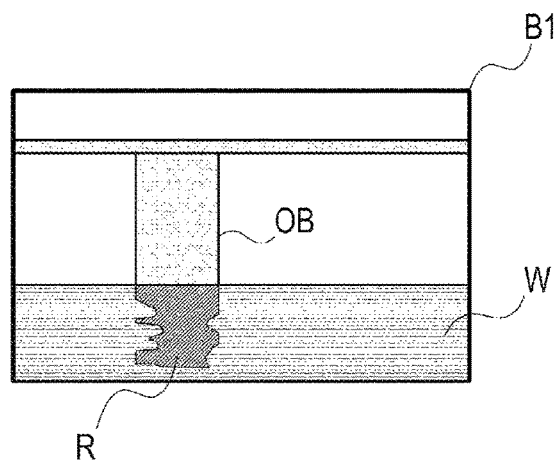
FIG. 2 shows an example of reflection of an object on a water surface according to the background art.
Figure 3A:
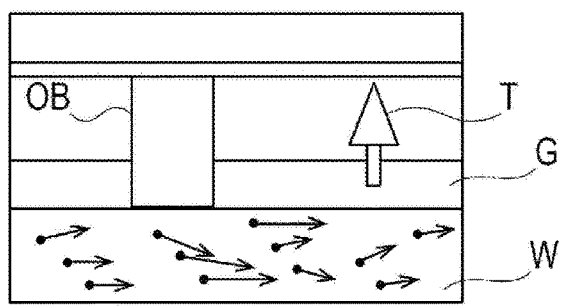
FIGS. 3A to 3C show an example of motion information other than water flow according to an embodiment.
Figure 3B:
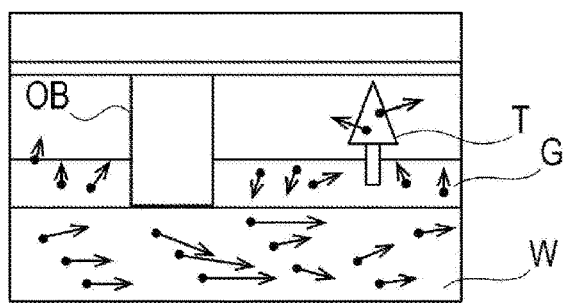
Figure 3C:
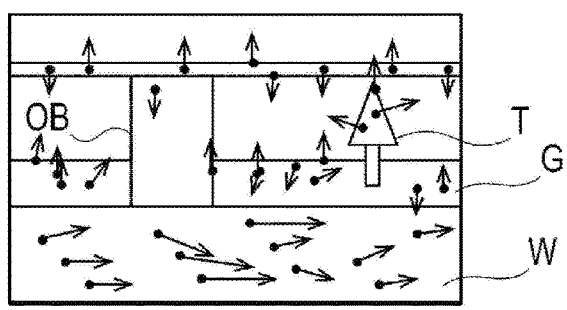

In the technique using graph cut based on motion information, it is necessary to appropriately judge motion of water flow. FIGS. 3A to 3C show examples in which there is motion information other than water flow. The motion information is indicated by arrows. FIG. 3A shows an example in which only water flow (motion of the water surface W) is shown as the motion information. FIG. 3B shows an example in which there is motion information in a grass area G and a tree T. FIG. 3C shows an example in which there is motion information in a structure OB such as a bridge pier or the like. In this case, generally, the motion information occurs due to shake of the camera itself. In the case of using the motion information to find the water surface W, the accuracy may deteriorate due to the motion of plants (the grass area G and the tree T) or the motion caused by the shake of the camera itself other than water flow (motion of the water surface W). Therefore, it is required to properly distinguish and remove such unnecessary motion information. Hereinafter, a river monitoring technique will be described in detail.

Figure 4:
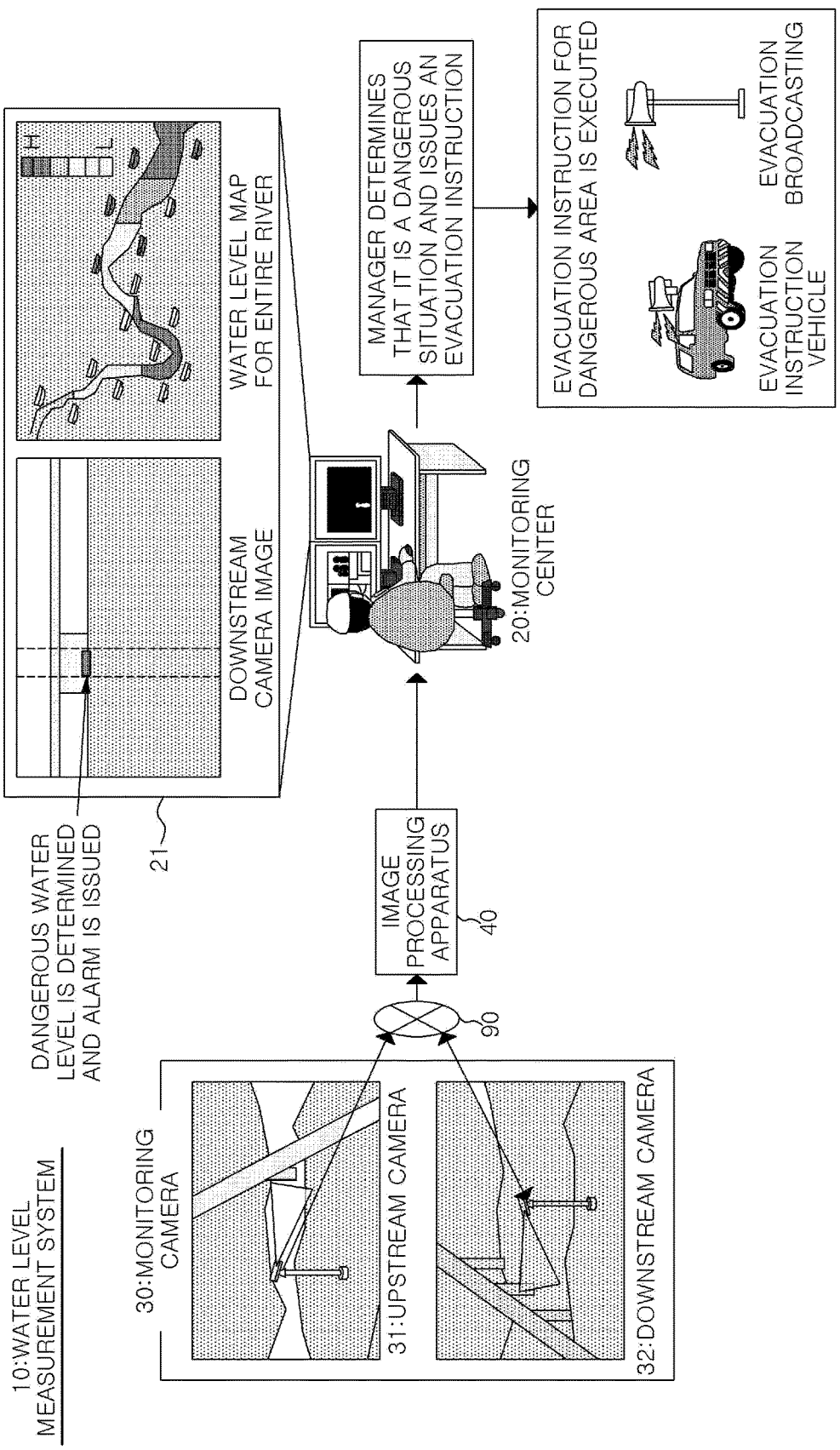
FIG. 4 schematically shows of a water level measurement system 10 according to an embodiment which performs image processing using a river monitoring camera.

FIG. 4 schematically shows the water level measurement system 10 that performs image processing using a river monitoring camera 30. The water level measurement system 10 includes the river monitoring camera 30 installed at a river and a monitoring center 20 connected thereto via a network 90. An image processing apparatus 40 is provided between the monitoring center 20 and the network 90. Here, an upstream camera 31 installed at an upstream side of the river and a downstream camera 32 installed at a downstream side of the river are used as examples of the river monitoring camera 30. When it is not necessary to distinguish the upstream camera 31 and the downstream camera 32, they will be simply described as the river monitoring camera 30.

An image from the river monitoring camera 30 installed at the river is sent to the monitoring center 20 via the network 90. The image processing apparatus 40 arranged therebetween performs water level measurement through image processing and displays a water level measurement result on a monitor 21 of the monitoring center 20. The water level measurement result and a position of the camera with respect to the entire river map are superimposed and displayed on the monitor 21.

In the monitoring center 20, the monitor image is monitored. When it is determined by a manager that it is a dangerous situation, an evacuation instruction is issued. Then, evacuation broadcasting for a dangerous area is executed and evacuation instruction vehicles or the like are dispatched so that the evacuation of the neighborhood can be carried out.

Figure 5:
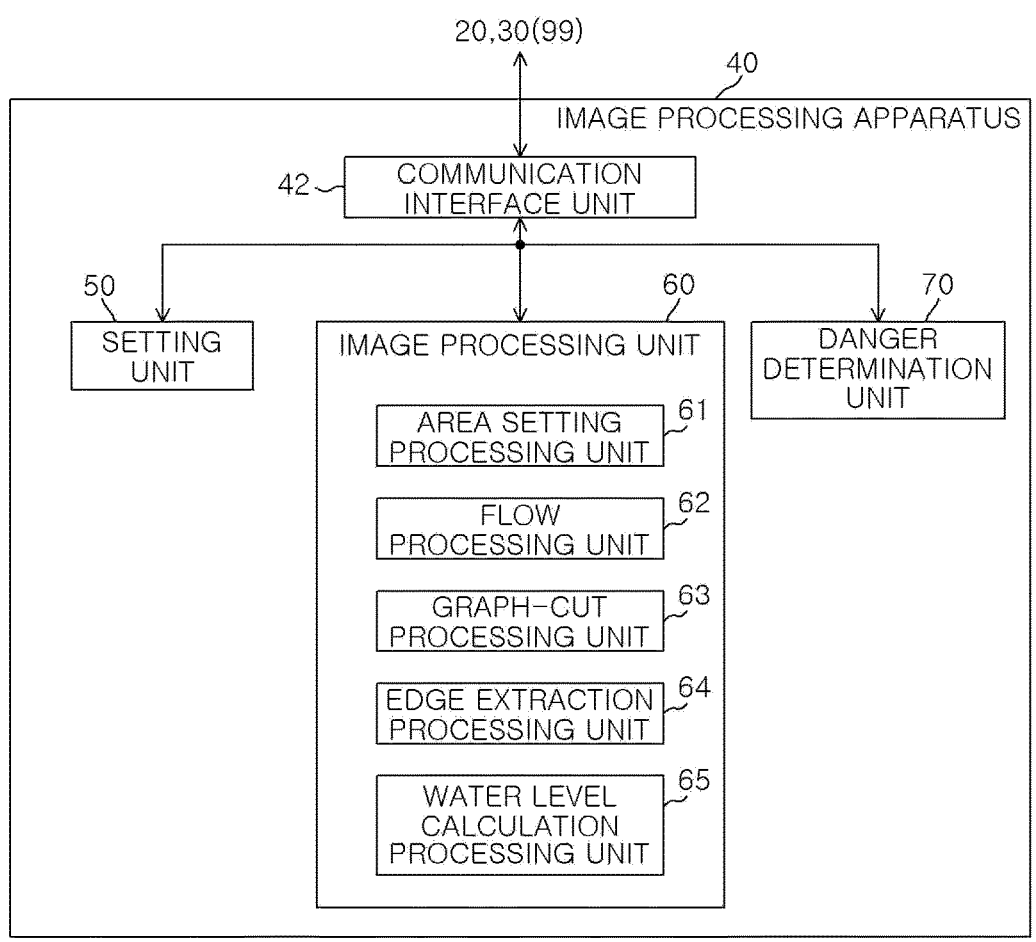
FIG. 5 is a block diagram showing a configuration of an image processing apparatus according to an embodiment.

FIG. 5 is a block diagram showing a configuration of the image processing apparatus 40. The image processing apparatus 40 includes a communication interface unit 42 for connecting with the monitoring center 20 and the river monitoring camera 30, a setting unit 50, and an image processing unit 60. Each component of the image processing apparatus 40 includes a memory or an LSI, e.g., an MPU or the like, and a function thereof is realized by executing a program stored in the memory.

The image processing unit 60 includes an area setting processing unit 61, a flow processing unit 62, a graph-cut processing unit 63, an edge extraction processing unit 64, and a water level calculation processing unit 65. Specific functions of the elements of the setting unit 50 and the image processing unit 60 will be described together with the processing flow.

In the present embodiment, the water level measurement system 10 that utilizes the existing river monitoring camera 30 is realized by providing the image processing apparatus 40 having the image processing function. However, when the river monitoring camera 30 has the function of the image processing apparatus 40, for example, the image processing apparatus 40 becomes unnecessary. As for the river monitoring camera 30, it is possible to use a visible light camera and a far infrared camera.

Figure 6:
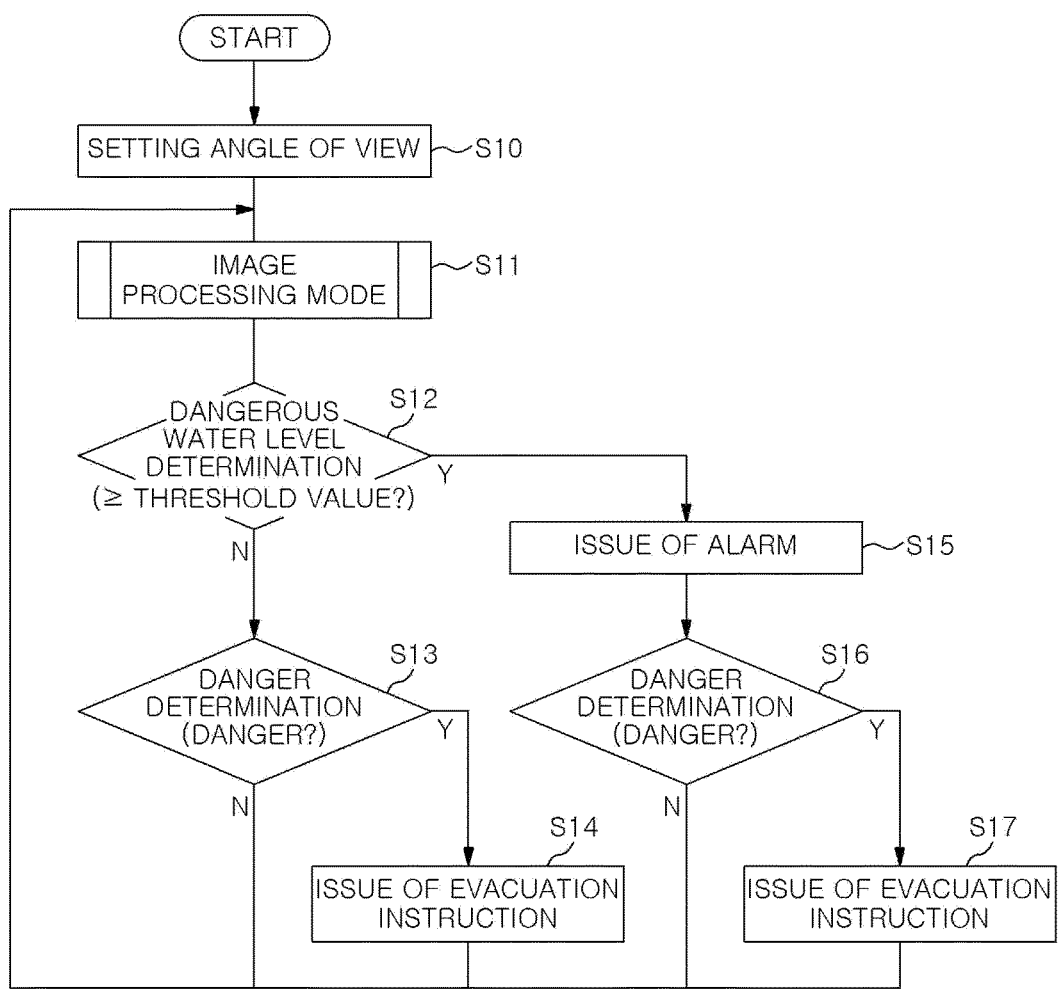
FIG. 6 is a flowchart of processes of a water level measurement system according to an embodiment.

FIG. 6 is a flowchart of processes of the water level measurement system 10. First, as initial setting, a manager or the like manipulates the setting unit 50 to set an angle of view of the river monitoring camera 30 (S10). Next, the image processing unit 60 executes an image processing mode (S11). The image processing mode and the angle of view setting process will be described in detail later with reference to FIGS. 7 to 14.

The image processing unit 60 constantly measures a water level and receives a result. When the result exceeds a preset dangerous water level (Y in S12), a danger determination unit 70 issues alarm (S15). Then, a manager determines whether or not it is dangerous (S16) and issues an evacuation instruction (N in S16), the evacuation instruction for the neighborhood is executed (S17). However, even if the alarm is not issued, if the manager determines, from the dangerous water level determination (Y in S12) and the monitoring image, that it is dangerous (Y in S13), the evacuation instruction is issued (S14). If the manager determines that the evacuation instruction is unnecessary (N in S13 and N in S16), the image processing mode is continued (S11).

Figure 7:
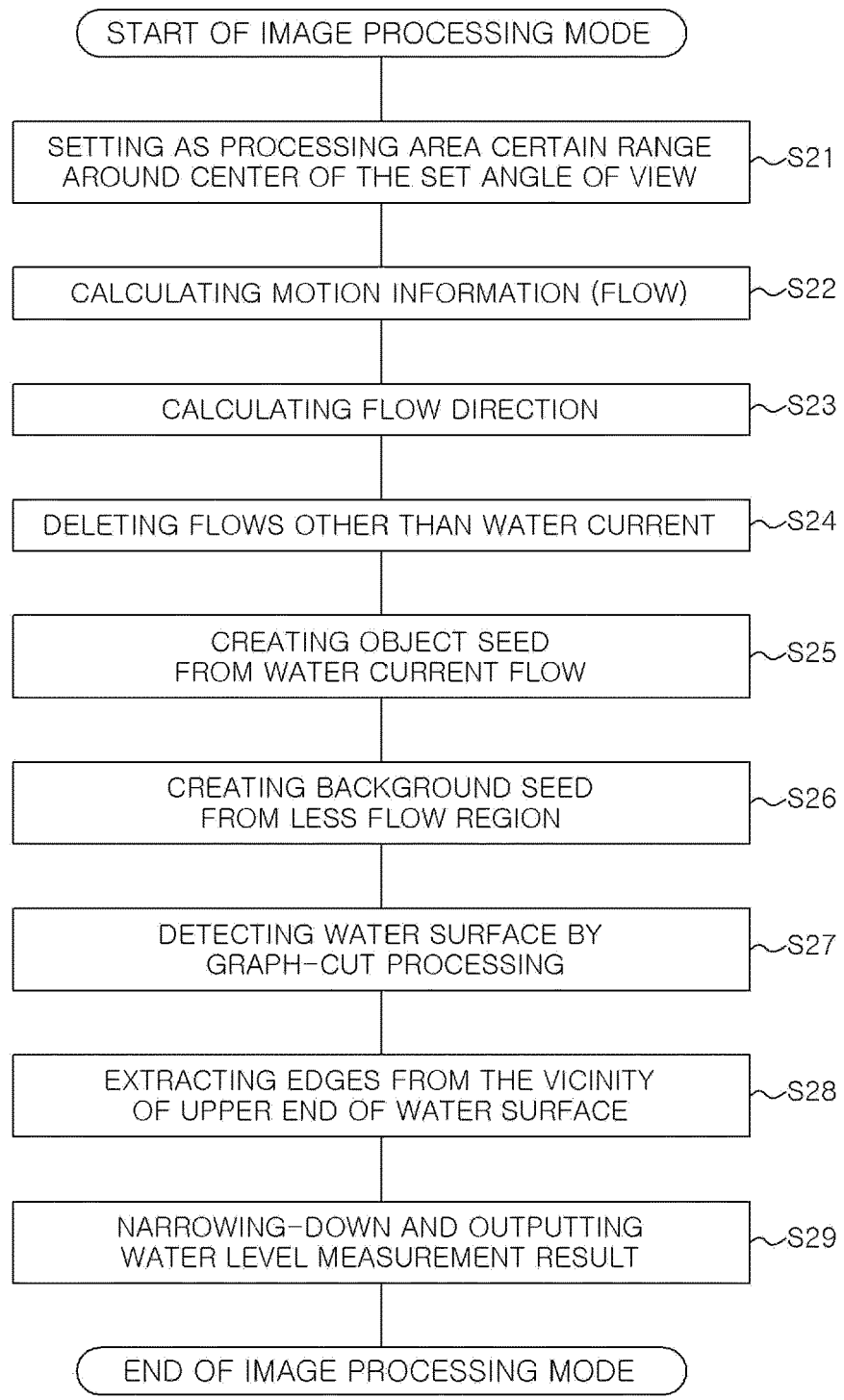
FIG. 7 is a flowchart of an image processing algorithm for measuring a water level according to an embodiment.

FIG. 7 is a flowchart of the operation of the image processing unit 60, i.e., the image processing algorithm (the image processing mode (S11) in FIG. 6) for measuring a water level. After the process of setting the angle of view (S10) of FIG. 6, the process of the image processing mode (S11) is performed.

First, the area setting processing unit 61 sets as a processing area a certain range around the center of the set angle of view (S21). At this time, the area setting processing unit 61 sets the processing area to be within a range of a background object such as a bridge pier or the like. Next, the flow processing unit 62 calculates motion information (flow) from the processing area (S22), and further calculates a flow direction (S23).

Then, the flow processing unit 62 calculates a flow density, determines a region having a high density and similar flow directions to be a flow of water current, and deletes flows in the other directions (S24). Accordingly, it is possible to delete the flows of plants and the flows due to the shake of the camera itself.

Next, the graph-cut processing unit 63 creates an object seed for graph-cutting by using the narrowed-down water current flow (S25). Here, a seed is considered a label. This will be described in detail later.

In the graph cutting, as the initial setting, a user selects a certain pixel in an object and a certain pixel in a background and cuts out the object based on label information. Therefore, the graph-cut processing unit 63 sets a region including a water current flow to an object seed and sets a region with less flow and separated by a certain distance from the water current flow to a background seed (S26). With this processing, it is possible to make the graph cutting automatic. Then, the graph-cut processing unit 63 detects a water surface by automatic graph cutting (S27).

Next, the edge extraction processing unit 64 extracts an edge from the vicinity of an upper end of the water surface detected by the graph-cut processing unit 63 (S28). The water level calculation processing unit 65 determines, as a water level line, an edge that has a certain length and that can be stably extracted for several frames among the extracted edges, and outputs a water level measurement result (S29). After the water level measurement result is outputted, the image processing mode is ended, and the processing proceeds to a dangerous level determination process of the danger determination unit 70 (process after S12 in FIG. 6).

FIGS. 8A to 8D show a process of setting angle of view and an example of an interface. On setting screens A11 to A13, a cross bar CB is displayed at the center of the image. An appropriate angle of view can be set by manipulating the river monitoring camera 30 such that a background object OB suitable for edge extraction such as a bridge pier or the like is positioned at the center of the cross bar CB (center of angle of view).

Figure 8A:
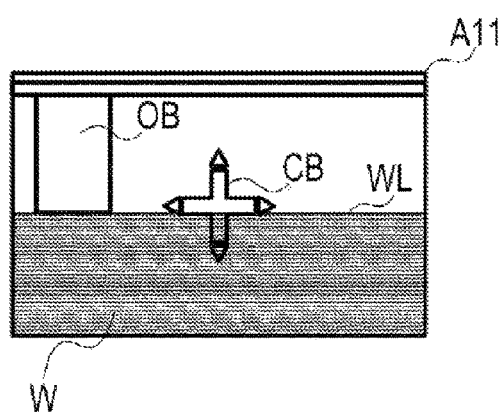
FIGS. 8A to 8D show a process of setting an angle of view and an example of an interface according to an embodiment.
Figure 8B:
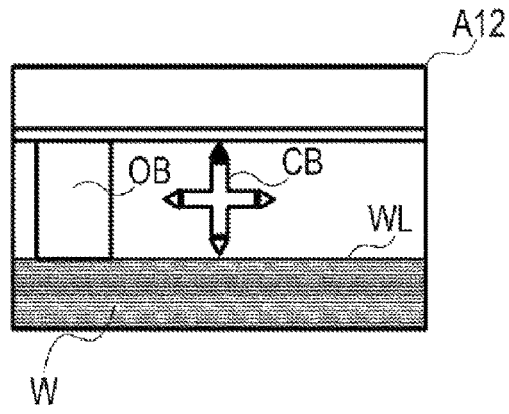
Figure 8C:
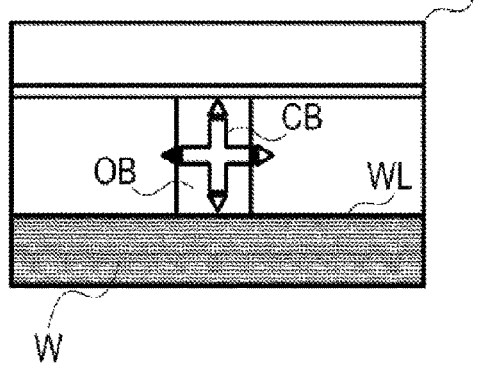
Figure 8D:
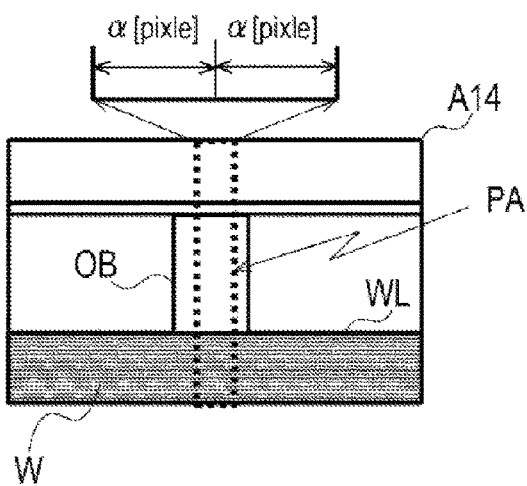

In the example shown in the drawings, when an initial angle of view is set as shown in the setting screen A11 of FIG. 8A, first, a user such as a manager or the like moves the river monitoring camera 30 upward as shown in the setting screen S12 of FIG. 8B and then to the left as shown in the setting screen A13 of FIG. 8C so that the bridge pier (background object OB) is positioned at the center of the cross bar CB. At this time, the zoom is adjusted to a size in which the maximum level and the minimum level of the water surface W can be shown. When the setting of angle of view is completed, the setting screen is ended and the cross bar CB on the screen is not displayed. Then, as shown in FIG. 8D, the setting unit 50 automatically sets an area indicated by dashed lines as a processing area PA. The processing area PA is defined by the range of a pixels at the right and the left from the center of the angle of view, and a value of the a pixel can be arbitrarily set. The setting unit 50 sets the processing area PA to be included within the background object OB such as a bridge pier or the like.

Next, the calculation of motion information and the calculation of flow direction will be described. The motion information (flow) is calculated by calculating an optical flow after the detection of feature points. The feature point detection can be performed by using SIFT (Scale-Invariant Feature Transform), SURF (Speeded Up Robust Features), or the like. The optical flow calculation can be performed by using block matching, a concentration gradient method, a Horn-Schunk method, a Lucas-Kanade method, or the like. In the present invention, a KLT (Kanade-Lucas-Tomasi) Tracker method in which the feature point detection and the optical flow calculation are combined is used.

Since the optical flow shows the motion vector of the feature point, an angle can be obtained from the vector. The angle obtained from the vector is defined as a direction by arbitrary resolution to be set as a flow direction.

Figure 9A:
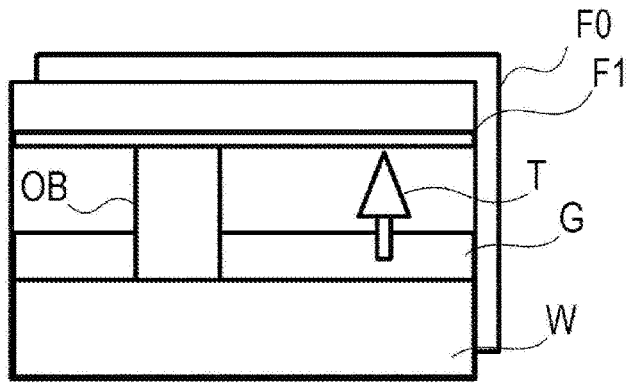
FIGS. 9A to 9C show a process of calculating an optical flow and a process of deleting flows other than water flow according to the embodiment.
Figure 9B:
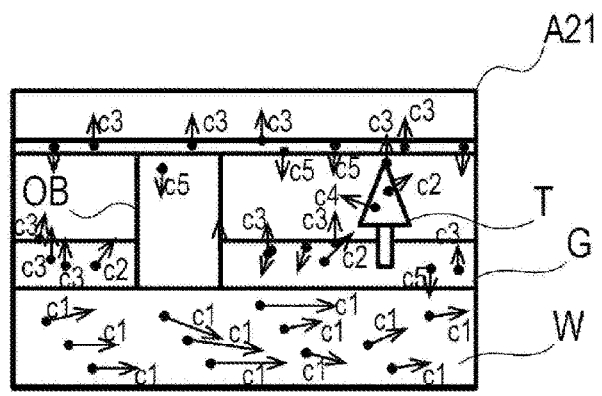
Figure 9C:
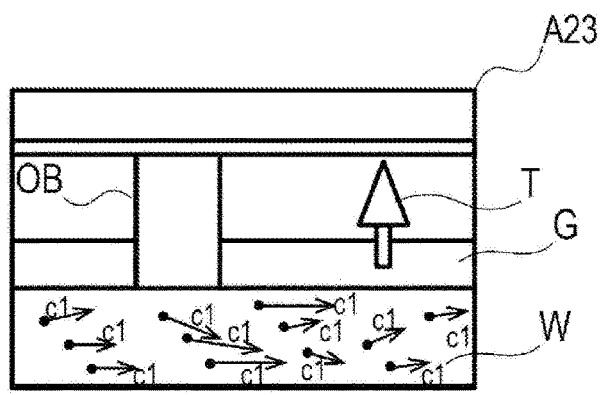
Figure 10:
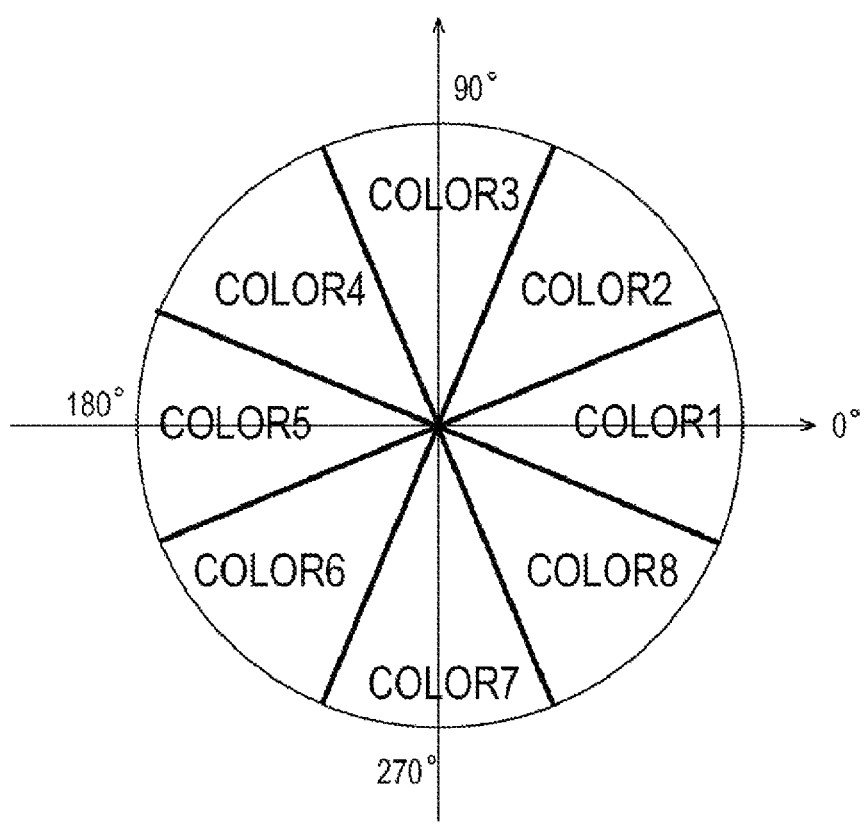
FIG. 10 is a coloring map showing relation between a direction and a color of a vector according to an embodiment.

FIGS. 9A to 9C show a process of coloring the calculated optical flow for each direction and deleting flows other than the water flow. FIG. 10 is a coloring map showing relation between a direction and a color of a vector. In the present embodiment, 360 degrees is classified into 8 ranges, and the classified ranges are colored with 8 types from COLOR 1 to COLOR 8. For example, in the case of a direction from −22.5 degrees to +22.5 degrees, a vector is displayed in a color (e.g., red) defined as COLOR 1.

The optical flow uses a current frame F1 and a past frame F0 as shown in FIG. 9A. By tracking the motion of the feature point between these two frames, the flow is calculated as shown in FIG. 9B and colored based on the coloring map of FIG. 10. Here, five types of directions, i.e., COLOR 1 (c1), COLOR 2 (c2), COLOR 3 (c3), COLOR 4 (c4), and COLOR 5 (c5), are shown.

Among these flows, flows having a high density and similar flow directions are set as the water flow directions, and the other flows are deleted. In the example of FIG. 9C, flows other than COLOR 1 (c1) are deleted.

Next, the graph cut based on motion information will be explained. This process is performed by the graph-cut processing unit 63. The graph cut is one of the segmentation methods for cutting out a target object from a single image. The graph cut can cut out a target object with high accuracy by solving a problem of energy minimization. However, it is required in the initial setting for a user to assign a label (seed) to an object region and a background region. Therefore, there is suggested to automate the graph cut by performing automatic labeling while setting a water current flow to an object area and an area with no flow to a background area. "Labeling" is also referred to as "assigning seed".

Figure 11A:
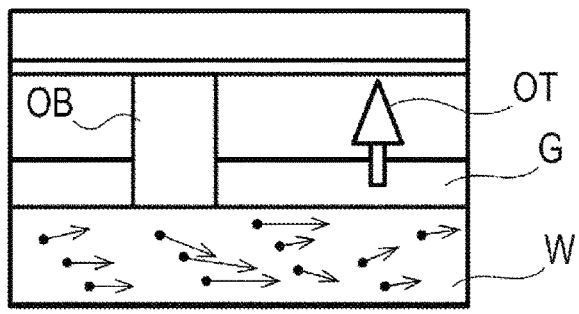
FIGS. 11A to 11C show a procedure of calculating a graph cut based on motion information according to an embodiment.
Figure 11B:
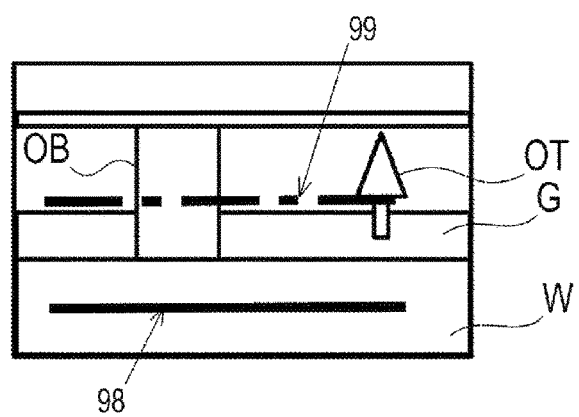
Figure 11C:
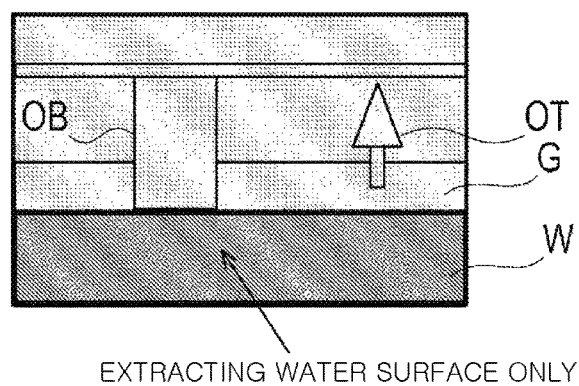

FIGS. 11A to 11C show a procedure of calculating the graph cut based on the motion information. First, with respect to the image of the calculated water current flow shown in FIG. 11A, a straight line is drawn at the center of the flow distribution as shown in FIG. 11B to create an object seed 98. Similarly, a straight line is drawn at a region with no flow and separated by a certain distance from the water current flow to create a background seed 99. By performing the graph cut based on these seeds, it is possible to extract only the water surface W as shown in FIG. 11C. Since the water level moves up and down, seeds need to be updated at a regular interval.

Figure 12A:
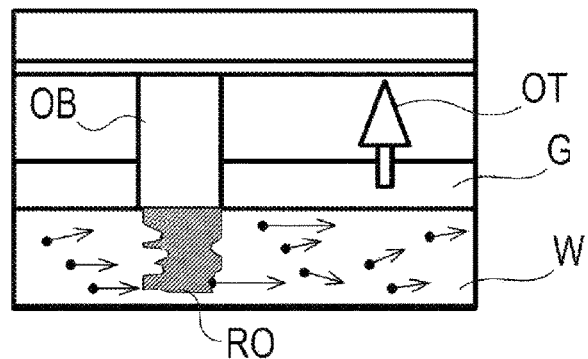
FIGS. 12A to 12C show a procedure of calculating a graph cut based on motion information in the case where there is reflection according to an embodiment.
Figure 12B:
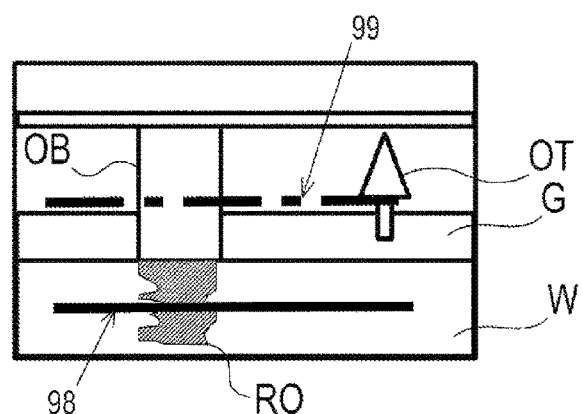
Figure 12C:
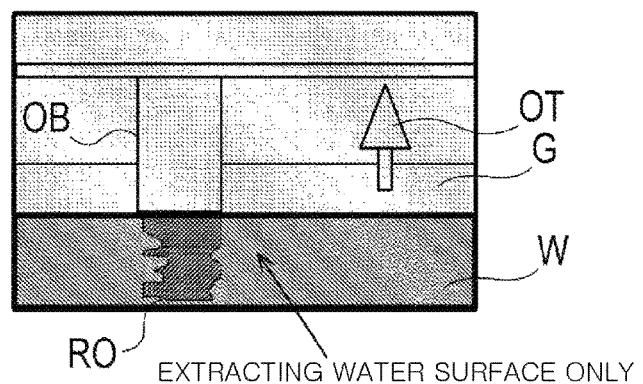

FIGS. 12A to 12C show a procedure of calculating the graph cut based on the motion information. FIGS. 12A to 12C illustrate an example in which there is reflection RO on the water surface W. With respect to the image of the calculated water current flow shown in FIG. 12A, a straight line is drawn at the center of the flow distribution to create an object seed 98 as shown in FIG. 12B. Here, the straight line of the object seed 98 crosses the reflection RO. Similarly to the case of FIGS. 11A to 11C, a straight line is drawn at a region with no flow and separated by a certain distance from the water current flow to create a background seed 99. By executing the graph cut based on these seeds, it is possible to extract only the water surface W as shown in FIG. 12C. Even if there is an area where the flow cannot be calculated due to the reflection RO on the water surface W, it is possible to extract only the water surface W as long as the portion of the reflection RO is assigned as the object seed 98.

Next, the process of extracting and narrowing-down an edge which is performed by the edge extraction processing unit 64 will be described.

Figure 13A:
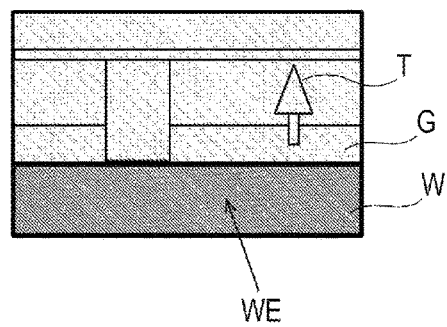
FIGS. 13A to 13D show processes from edge extraction to output of a water level measurement result according to an embodiment.
Figure 13B:
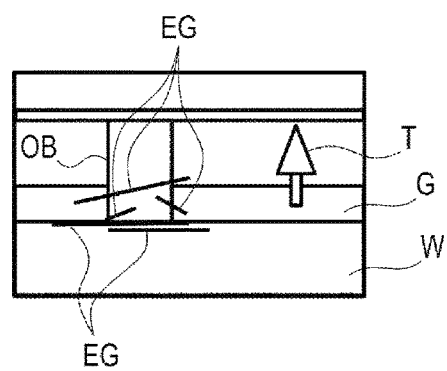

FIGS. 13A to 13D show processes from the edge extraction to the output of the water level measurement result. After the water surface W is detected by the processing described in FIGS. 11A to 11C or FIGS. 12A to 12C, i.e., after the water surface area WE is specified as shown in FIG. 13A, the edge extraction processing unit 64 extracts an edge from the vicinity of the upper end of the water surface W. The edge extraction processing unit 64 extracts the edge EG as shown in FIG. 13B by using Canny, Sobel, Laplacian, or the like.

Figure 13C:
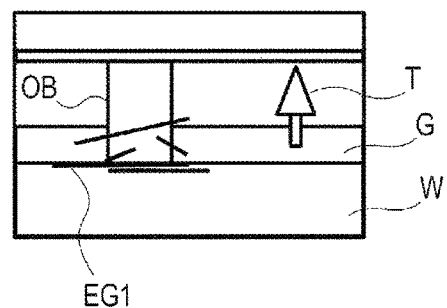
Figure 13D:
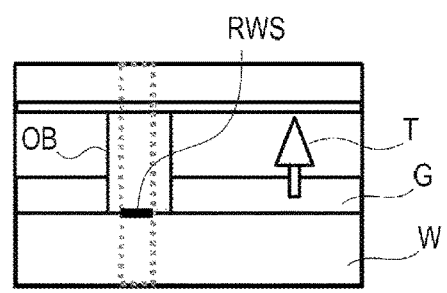

Thereafter, as shown in FIG. 13C, the edge extraction processing unit 64 selects an edge EG1 in consideration of features such as a distance to the water surface, a length of the edge, stable extraction of the edge for several frames, and the like, and outputs the measurement result with the edge position as a water level RWS, as shown in FIG. 13D. Here, a portion of the edge EG1 which is included in the processing area set by the area setting processing unit 61 is displayed as the water level RWS.

Figure 14:
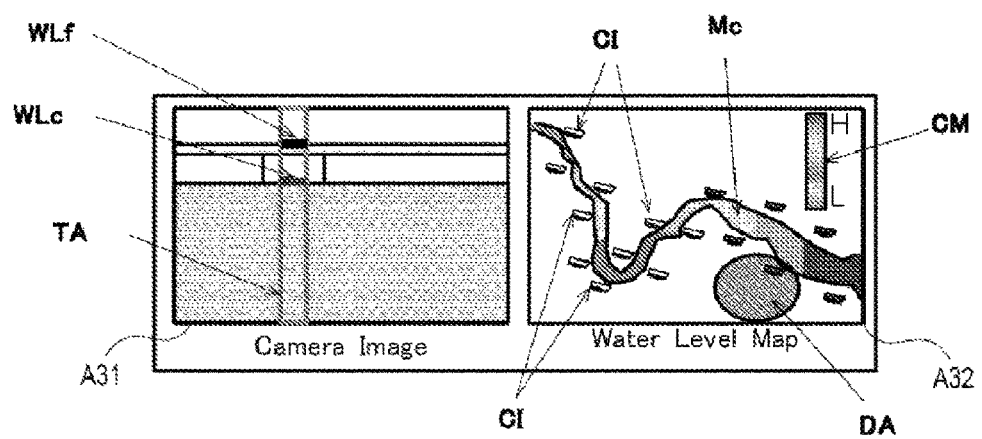
FIG. 14 shows an interface for displaying the water level measurement result according to an embodiment.

FIG. 14 shows a display interface of the water level measurement result which is displayed on the monitor 21 of FIG. 4. The processing area TA and the current water level WLc are displayed on the camera image A31. If water level prediction information can be acquired from another device, a future water level WLf is also displayed, which is more useful for danger determination.

In a water level map A32, the measured water level is displayed based on the color map CM, and a water level map Mc is displayed so that the water level condition of the entire river can be monitored at a glance. For example, red indicates a high water level and blue indicates a low water level. In the example of the drawing, the water level is high at the downstream side and low at the upstream side.

Then, a camera icon CI is displayed at a camera installation position, and the camera image A31 is switched by manipulation such as clicking or the like. When it is determined from the measurement result that the water level is dangerous, the color of the camera icon CI is changed and displayed. Then, a dangerous area DA that needs evacuation is displayed on the map. By clicking the dangerous area, the information on municipalities or the like which needs an evacuation instruction is displayed, and the evacuation instruction can be issued by single click in conjunction with another alarm system.

As described above, in accordance with the present embodiment, it is possible to accurately measure the water level, and specific water level variation of the river can be observed by applying the present invention to an existing river monitoring camera. Further, it is possible to observe an actual water level and an actual state of a river together by superimposing the water level on the monitoring camera image. Therefore, a system useful for determining an evacuation instruction can be constructed. In addition, since the interface that can be initialized by a user is realized, the angle of view after the application can be easily changed while minimizing an application cost.

The present invention has been described based on the embodiments. It is to be understood by those skilled in the art that the embodiments are merely examples and various modifications can be made to combinations of the respective components and such modifications are also within the scope of the present invention.

DESCRIPTION OF REFERENCE NUMERALS

10: water level measurement system
20: monitoring center
21: monitor
30: river monitoring camera
31: upstream camera
32: downstream camera
40: image processing apparatus
42: communication interface unit
50: setting unit
60: image processing unit
61: area setting unit
62: flow processing unit
63: graph-cut processing unit
64: edge extraction processing unit 65: water level calculation processing unit
70: danger determination unit
90: network

What is claimed is:

1. A water level measuring system comprising:
a flow processing unit configured to acquire an image with a water surface and a structure and calculate motion information;
a graph-cut processing unit configured to specify a water surface region of the water surface by using a graph cut theory based on the motion information; and
a water level calculating unit configured to calculate a water level based on a boundary between the water surface region and another region,
wherein the flow processing unit extracts a water current flow from the motion information,
the graph-cut processing unit extracts the water surface region by performing labeling processing on the extracted water current flow and the other flows based on the graph cut theory.

2. The water level measuring system of claim 1, further comprising:
an edge extraction processing unit configured to extract an edge near a boundary between the water surface region specified by the graph-cut processing unit and another region and set an edge satisfying a predetermined feature from the extracted edge to a boundary for calculating the water level.

3. The water level measurement system of claim 1, further comprising:
a setting unit configured to set an angle of view of a camera that images the image with the water surface and the structure by manipulating a cross bar displayed on a screen.

4. A water level measurement method for measuring a water level of a river by using an image processing technique, the method comprising:
a flow processing step of acquiring an image with a water surface and a structure and calculating motion information (motion vector);
a graph cut processing step of specifying a region of the water surface by using a graph cut theory based on the motion information; and
a water level calculating step of calculating a water level based on a boundary between the water surface region and another region,
wherein in the flow processing step, a water current flow is extracted from the motion information, and
in the graph cut processing step, the water surface region is extracted by performing labeling processing on the extracted water level flow and the other flows based on the graph cut theory.

5. The water level measurement method of claim 4, further comprising:
an edge extracting step of extracting an edge near the boundary between the water surface region specified in the graph cut processing step and calculating an edge satisfying a specific feature from the extracted edge.

* * * * *